Jan. 27, 1970   O. LINDSTROM   3,492,166
FUEL CELL DEVICE
Filed April 22, 1968

INVENTOR.
OLLE LINDSTROM
BY
Jennings Bailey Jr

United States Patent Office 3,492,166
Patented Jan. 27, 1970

1

3,492,166
FUEL CELL DEVICE
Olle Lindstrom, Vasteras, Sweden, assignor to Allmänna Svenska Elektriska Aktiebolaget, Vasteras, Sweden, a Swedish corporation
Filed Apr. 22, 1968, Ser. No. 723,062
Claims priority, application Sweden, Apr. 25, 1967, 5,786/67
Int. Cl. H01m 27/02, 27/00
U.S. Cl. 136—86                5 Claims

ABSTRACT OF THE DISCLOSURE

In a fuel cell having chambers to which gas is fed and from which it is removed, a gas distributing member is arranged within the chamber across the path of the gas between the inlet and the outlet composed of a porous wall permeable to gas which covers only a small portion of the surface of the electrode facing the gas chamber. The pressure drop produced by this porous wall is at least equal to the combined pressure drop in the gas in the portions of the chamber other than the wall.

BACKGROUND OF THE INVENTION

Field of the invention

The invention relates to fuel cell devices in which gas is supplied to a gas chamber arranged adjacent an electrode.

The prior art

In fuel cell devices where a gas is supplied to a gas chamber arranged adjacent an electrode to react as fuel or oxidant at the electrode, it is important that the gas is distributed evenly over the entire surface of the electrode. Trying to effect this by filling the entire gas chamber with a gas-permeable solid material consisting of, for example, particles of a suitable material sintered together gives only a very small, if any, improvement of the distribution of the gas. The result can be improved if channels for the gas are arranged in known manner in different directions within the solid material, but still no satisfactory distribution of the gas is obtained. This also requires extremely complicated processes in order to effect such channels in the solid material.

SUMMARY OF THE INVENTION

According to the present invention a particularly even distribution of the gas is achieved across the entire surface of the electrode in a very simple manner.

The present invention relates to a fuel cell device comprising at least one electrode having a gas chamber arranged adjacent the electrode, the electrode forming one boundary wall of the chamber and through which chamber a gas reacting at the electrode can pass between an inlet and an outlet for the gas, characterised in that a porous wall permeable to the gas is arranged across the gas chamber in the path of the gas between the inlet and the outlet, which wall covers only a small portion of the surface of the electrode facing the gas chamber and is adapted to effect a pressure drop in the gas when the gas passes it, the pressure drop being considerable in relation to the pressure drop in the gas when it passes from the inlet to the porous wall and from the porous wall to the outlet.

The invention is of particular importance when the gas contains an inert component as is the case, for example, when air is used as oxidant or, for example, when cracked ammonia is used as fuel. When there is an uneven distribution of the gas, higher concentrations of inert gas arise locally which reduces the performance of the electrode.

The porous wall should cover at the most about 25%, preferably at the most about 10% of the surface of the electrode facing the gas chamber. In many cases it is possible to use walls covering as little as 1% of the surface of the electrode facing the gas chamber.

The drop in pressure of the gas when it passes the porous wall should be at least 50, and preferably at least 90% of the drop in pressure of the gas when it passes from the inlet to the outlet in the gas chamber.

It is suitable that the porous wall is arranged substantially perpendicular to the shortest path for the gas between its inlet to the gas chamber and its outlet from the gas chamber. The wall may suitably be arranged at substantially the same distance from the inlet as from the outlet.

The porous wall may, amongst other things, consist of a porous synthetic resinous body such as a sheet of a fibrous thermoplastic resin consisting of, for example, polytetrafluorethylene, polycarbonate or polyethylene glycol terephthalate or of a body of particles of one of these thermoplastic resins sintered together. It may also consist of a porous metal body, for example, consisting of particles of nickel, cobalt, molybdenum or other metal or metal alloy resistant to gas, sintered together. When choosing the material for the porous wall, it must also be considered whether an electrical connection is desired or not between the electrode and the other boundary wall of the gas chamber, which may also be an electrode.

In fuel cell devices comprising several gas chambers for gases of the same type, for example a fuel, a particular advantage is obtained if a porous wall is arranged in each gas chamber and the gas chambers are parallel-connected between a common supply channel for the gas and a common removal chamber for it. An even distribution of the gas is thus obtained between the different gas chambers without the use of large and space-consuming supply and removal channels or narrow inlets to the chambers and narrow outlets therefrom which may easily become blocked. In comparison with series-connecting the gas chambers, space is also saved since with series-connection large channels are required which means great distances between the electrodes in order to avoid considerable pressure drops. With the use of porous walls in parallel-connected gas chambers the pressure drop across the porous wall in each gas chamber when the gas passes through this should be at least about 50 percent, and preferably at least about 90 percent of the pressure drop in the gas when it passes through the fuel cell device, that is, of the pressure drop in the gas between its inlet into the common supply channel and its outlet from the common removal channel.

BRIEF DESCRIPTION OF THE DRAWING

The invention will be explained by description of a number of embodiments with reference to the accompanying drawings in which.

DESCRIPTION OF THE PREFERRED EMBODIMENTS

Figure 1:
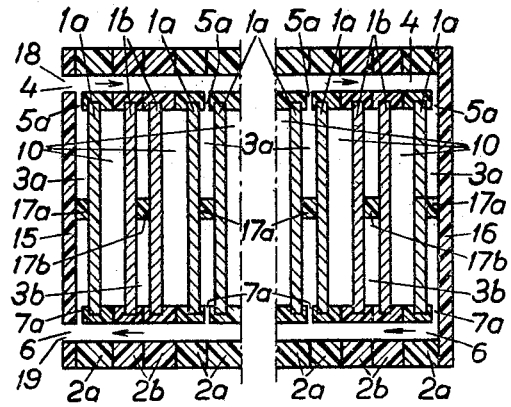
FIGURE 1 shows schematically a fuel cell device according to the invention in a section through the supply and removal channels for the oxidant, FIGURE 2 schematically the same fuel cell device in a section through the supply and removal channels for the fuel
Figure 2:
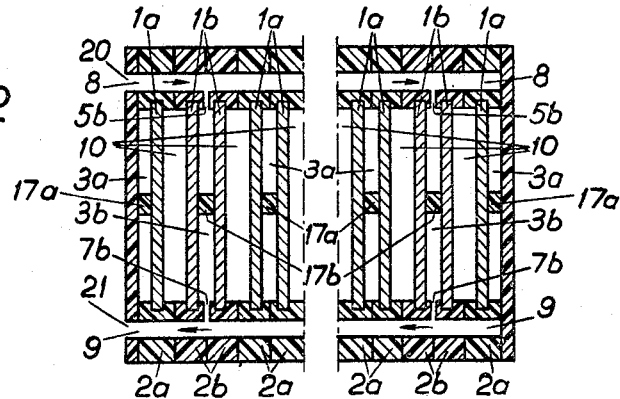
Figure 3:
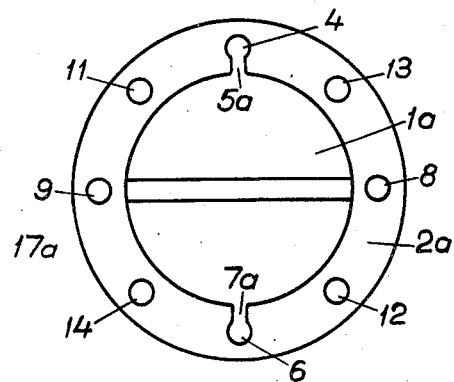
FIGURE 3 shows schematically a front view of an electrode in the fuel cell device with a porous wall applied on the side facing a gas chamber.

The fuel cell device according to the drawing comprises a number of electrodes 1a and 1b, respectively, in the form of circular discs attached in a gas-tight manner in frames 2a and 2b, respectively, of thermoplastic resin. The drawings show only a few of the electrodes which, in large fuel cell batteries, amount to a considerable number. The first-mentioned electrodes 1a, the oxidant electrodes, the frames of which are designated 2a, face the gas chamber 3a containing oxidant, oxygen gas in the example given, and the other electrodes 1b, the fuel electrodes, the frames of which are designated 2b, face the gas chamber 3b containing fuel, in the example a mixture of hydrogen and nitrogen obtained by cracking ammonia. The oxygen is supplied continuously to the gas chamber 3a from the common supply channel 4 for oxygen, through the inlet 5a and unconsumed oxygen is removed continuously from the gas chamber 3a to the common removal channel 6 for oxygen, through the outlet 7a. In a similar manner fuel is supplied continuously to the gas chamber 3b from the common supply channel 8 for fuel, through the inlet 5b and unconsumed fuel is continuously removed from the gas chamber 3b to the common removal channel 9 for fuel, through the outlet 7b. The electrolyte, which is liquid, is supplied to the electrolyte chamber 10 and is removed therefrom through channels 11 and 12, respectively (FIG. 3) arranged for this purpose. These are connected to the electrolyte chamber in the same way as the supply and removal channels for the oxygen and fuel are connected to their respective gas chambers. Channels 13 and 14 are also arranged in the resinous frames for the positive or negative current screens with which the various cells may be series-connected or parallel-connected, respectively. Outermost in the stack of electrodes with intermediate gas and electrolyte chambers are two end plates 15 and 16. The whole stack may be held together, for example by two strong plates, not shown, arranged outside the end plates 15 and 16, having set bolts arranged through them. Channels, gas chambers and electrolyte chambers are effectively sealed by washers, not shown, or by welding together the resinous frames around the channels and chambers in question.

The oxidant electrode 1a is of conventional type and may consist of nickel activated by silver. The fuel electrode 1b is also of conventional type and may, for example, be made of nickel activated by platinum. It may be provided in the usual manner with an extra layer facing the electrolyte having finer pores than in the active layer. The electrolyte may consist of a water solution of potassium hydroxide.

According to the invention a porous wall 17a is arranged straight across each gas chamber 3a and a porous wall 17b is arranged straight across each gas chamber 3b. In the example shown it is arranged perpendicular to the shortest path for the gas between the inlet 5 and the outlet 7 (5a and 7a according to FIGURE 3), and at substantially the same distance from the inlet and the outlet. The porous wall consists in the shown device of a sheet of polyethylene glycolterephthalate having a width of 10 mm. and a thickness of 0.5 mm. The wall is held in position between the electrodes or between one electrode and one end plate by being pressed against these as well as against the surrounding frames so there are no leakage paths for the gas. It may also be fixed to the electrodes, end plates and frames with the help of a binder such as resinous binder. The surfce of n electrode is a such as a resinous binder. The surface of an electrode is approximately 300 cm.$^2$. The pressure of the oxygen at the inlet 18 to the common supply channel 4 for the oxidant may be about 2.52 bar and the pressure at the outlet 19 of the common removal channel 6 may be 2.50 bar. The drop in pressure of the gas between the inlet 18 and the outlet 19 is thus 0.02 bar. The porous wall 17a in each gas chamber 3a has a porosity providing a pressure drop of 0.018 bar when the gas passes through it, that is, 90 percent of the drop in pressure of the gas when passing through the fuel cell device is effected by the wall 17a. The pressure of the fuel at the inlet 20 to the channel 8 and also at the outlet 21 of the channel 9 may reach the same value as for the oxygen at corresponding points in the oxygen system. The porous wall 17b in each gas chamber 3b has the same porosity and gives the same pressure drop as a wall 17a.

I claim:
1. Fuel cell device comprising at least one electrode having a gas chamber arranged adjacent the electrode, the electrode forming a boundary wall of the chamber and through which chamber a gas reacting at the electrode can pass between an inlet and an outlet for the gas, characterized in that a porous wall means permeable to the gas for affecting a pressure drop in the gas when the gas passes through it is arranged across the entire width of the gas chamber in the path of the gas between the inlet and the outlet, which wall covers only a small portion of the surface of the electrode facing the gas chamber, the pressure drop being at least as great as the combined pressure drop in the gas when it passes from the inlet to the porous wall and from the porous wall to the outlet.

2. Fuel cell device according to claim 1, characterized in that the porous wall means is arranged substantially perpendicular to the shortest path of the gas between the inlet and the outlet.

3. Fuel cell device according to claim 1, characterized in that the porous wall means is arranged at substantially the same distance from the inlet as from the outlet.

4. Fuel cell device according to claim 1, characterized in that the porous wall is made of a thermo-plastic resin.

5. Fuel cell device according to claim 1, containing several gas chambers for gas of the same type, each provided with an inlet and an outlet for the gas, characterized in that said porous wall means is arranged in each of the gas chambers and the inlets are connected to a common supply channel for the gas and the outlets connected to a common removal channel for the gases, so that the gas chambers are parallel-connected between the supply and removal channels.

References Cited
UNITED STATES PATENTS

| | | | |
|---|---|---|---|
| 3,146,131 | 8/1964 | Linden et al. | 136—86 |
| 3,206,333 | 9/1965 | Ehrenfeld | 136—86 |

WINSTON A. DOUGLAS, Primary Examiner

H. A. FEELEY, Assistant Examiner